United States Patent [19]

Sanuki et al.

[11] Patent Number: 5,373,054

[45] Date of Patent: Dec. 13, 1994

[54] PROCESS FOR AGGLOMERATING POWDER

[75] Inventors: Shinji Sanuki, Kyoto; Yoshinori Chosakon, Ogaki; Tsukasa Oishi, Muko, all of Japan

[73] Assignee: Nippon Gohsei Kagaku Kogyo Kabushiki Kaisha, Osaka, Japan

[21] Appl. No.: 987,995

[22] Filed: Dec. 9, 1992

Related U.S. Application Data

[63] Continuation of Ser. No. 600,873, Oct. 22, 1990, abandoned.

[30] Foreign Application Priority Data

Oct. 23, 1989 [JP] Japan .................. 1-276238

[51] Int. Cl.$^5$ .................. C08L 29/04; C08L 33/24; C08L 33/26
[52] U.S. Cl. .................. 525/57; 525/59; 525/934
[58] Field of Search .................. 525/57, 59, 934

[56] References Cited

U.S. PATENT DOCUMENTS

| | | | |
|---|---|---|---|
| 3,106,543 | 10/1963 | Milne et al. | 525/57 |
| 4,708,999 | 11/1987 | Marten | 526/320 |
| 4,946,720 | 8/1990 | Oishi et al. | 428/286 |

FOREIGN PATENT DOCUMENTS

| | | | |
|---|---|---|---|
| 0868987 | 4/1971 | Canada | 525/57 |
| 0247326 | 12/1987 | European Pat. Off. | |
| 1009473 | 11/1965 | United Kingdom | 525/59 |
| 2162525 | 2/1986 | United Kingdom | |
| 8605191 | 9/1986 | WIPO | 525/57 |

*Primary Examiner*—James J. Seidleck
*Assistant Examiner*—W. R. H. Clark
*Attorney, Agent, or Firm*—Armstrong, Westerman, Hattori, McLeland & Naughton

[57] ABSTRACT

A process for agglomerating a polymer powder which comprises mixing a polymer powder with an oxyalkylene group-containing polyvinyl alcohol resin in the presence of water and drying the resulting mixture. According to the process of the present invention, it is possible to easily prepare the polymer granules having little fine powder, a narrow particle size distribution and a large average particle size.

9 Claims, No Drawings

PROCESS FOR AGGLOMERATING POWDER

This application is a continuation of application Ser. No. 07/600,873 filed Oct. 22, 1990, now abandoned.

BACKGROUND OF THE INVENTION

The present invention relates to a process for agglomerating a polymer powder, more particularly to an agglomeration process of a polymer powder which is prepared in a reversed phase suspension polymerization, reversed phase emulsion polymerization or polymerization in static state, and especially to an agglomeration process of a high water-absorbent resin powder.

Acrylic high water-absorbent resin powders have hitherto been prepared in a manner wherein an acrylic high water-absorbent polymer is prepared in reversed phase suspension polymerization, reversed phase emulsion polymerization or polymerization in static state, then the obtained polymer is dried as it is, or further, the dried one is pulverized. Also, resin powders other than the acrylic resin powders are prepared in suspension polymerization or emulsion polymerization in addition to the above-mentioned polymerization methods.

The resin powders prepared by the above-mentioned methods, however, have usually much fine powder which can pass through a 100 mesh standard sieve. Such resin powders have the following defects:

(1) Dusts are easily generated, the working surrounding becomes easily bad and final products easily lose in weight.

(2) The miscibility and dispersibility of the resin powder with another material are bad.

(3) It is easy to make undissolved lumps of the resin powder when contacting with liquid.

(4) Bridging and flushing are easily caused in a hopper due to poor fluidity of the resin powder.

For solving the above-mentioned defects, it has been proposed to remove the fine powder from the obtained powder or to agglomerate the powder, using a binder.

The former method is economically disadvantageous. The latter method is, when using an organic solvent binder, in danger of catching fire in a drying step of the obtained granules, and if insufficiently drying the granules, they are problematic in safety to human bodies due to the remaining organic solvent therein. When using, as the binder, a conventional aqueous liquid (for instance, water alone, an aqueous mixture of water and an organic solvent miscible with water or an aqueous solution wherein a water-soluble high molecular weight compound such as polyacrylic acid or polyvinyl alcohol is dissolved in water or the aqueous mixture as mentioned above), though there is no problem caused in the case that the organic solvent binder is used, it is difficult that the aqueous liquid is uniformly diffused, in other words, the aqueous liquid is unevenly distributed in the powder, and big lumps of the powder, having high density (hereinafter referred to as "block") are produced in the obtained granules. Thus, it is difficult to obtain uniform granules.

As an agglomeration process of a high water-absorbent resin powder which improves the above-mentioned defects, there are processes described in Japanese Unexamined Patent Publication No. 61-97333 and No. 61-101536, wherein a mixture of a high water-absorbent resin powder and an inorganic powder is stirred in a specific apparatus, and to the resulting mixture is added the aqueous liquid. According "to these processes, it is required to supply the aqueous liquid in the state of a fine droplet to the high water-absorbent resin powder, for uniformly mixing the resin powder with the aqueous liquid. When using the water-soluble high molecular weight compound as the binder, however, for supplying its aqueous solution in the state of a fine droplet to the resin powder, it is necessary to make the amount of the binder small or to dissolve the binder in a large amount of water because of its high viscosity. Thus, the obtained granules are poor in strength or it is required to expend much time and much energy in drying them. On the other hand, if the aqueous liquid is not supplied in the state of a fine droplet to the resin powder stirred at a high speed by using the specific apparatus, the uniform granules are not obtained and the blocks are generated partially.

Since the blocks impair the physical properties of the final product, it has been desired to develop a binder having an excellent diffusibility to resin powder.

It is an object of the present invention is to provide a process for agglomerating various kinds of resin powders having a fine powder which is difficult to handle, including high water-absorbent resin powders, by which granules having a particle size suitable for practical use and a narrow particle size distribution can be obtained.

This and other objects of the present invention will become apparent from the description hereinafter.

SUMMARY OF THE INVENTION

In accordance witch the present invention, there is provided a process for agglomerating a polymer powder which comprises: mixing a polymer powder with a powder of an oxyalkylene group-containing polyvinyl alcohol resin in the presence of water, and drying the resulting mixture.

DETAILED DESCRIPTION

The polymer powders used in the present invention are not particularly limited. Examples of the polymers are, for instance, high water-absorbent resins such as crosslinked polyacrylic acid salts e.g. sodium polyacrylate, hydrolyzates of crosslinked acrylic ester-vinyl acetate copolymers, crosslinked starch-acrylic acid salt graft copolymer, hydrolyzates of crosslinked starch-acrylonitrile graft copolymer and crosslinked polyvinyl alcohol grafted with maleic anhydride; acrylic ester polymers, vinyl acetate polymers, acrylonitrile polymers, vinyl chloride polymers, ethylene-vinyl alcohol polymers, ethylene-vinyl acetate polymers, and the like.

Among the high water-absorbent resins, the crosslinked polyacrylic acid salts are preferable, because when preparing final products such as a diaper by using them, the obtained products are excellent in physical properties such as a rate of water absorption. The polymer may be used alone or as an admixture thereof.

These high water-absorbent resin powders are prepared, in general, by conducting a reversed phase suspension polymerization, reversed phase emulsion polymerization, polymerization in static state or the like to synthesize a high water-absorbent resin, and drying it as it is, further pulverizing the dried one when occasion demands. The preparation method of the high water-absorbent resin powder used in the present invention is not limited to the above-mentioned methods and the resin powders can be prepared in any manner.

Also, in the present invention, as the high water-absorbent resin powder, there can be used the resin powders whose not only surface but also surface and inside are crosslinked by using a crosslinking agent disclosed in Japanese Unexamined Patent Publication No. 58-180233, No. 58-117222, and No. 58-42602 to increase the rate of water absorption and the dispersibility to water. Examples of the crosslinking agents are, for instance, an epoxy compound having the formula:

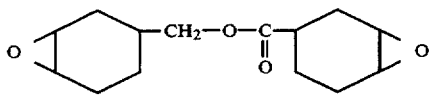

a condensation product of a long-chain dibasic acid and epichlorohydrin, a reaction product of bisphenol A and epichlorohydrin, and the like. It is preferable that the amount of the crosslinking agent is from 0.0005 to 3 parts by weight, more preferably from 0.01 to 1 part by weight, based on 100parts by weight of the high water-absorbent resin powder which is the raw material. When the amount of the crosslinking agent is more than 3 parts by weight, it tends to lower the water absorbency thereof.

The average particle size of the polymer powder varies depending on the preparation methods. Generally, the average particle size of the polymer powder is from 0.1 to 200 μm, preferably from 80 to 150 μm.

In the agglomeration process of the present invention, as the binder, thee oxyalkylene group-containing polyvinyl alcohol resin (hereinafter referred to as "OA-containing PVA") is used. The OA-containing PVA is a polyvinyl alcohol having an oxyalkylene group as its side chain.

Since the OA-containing PVA is larger in water-solubility (the dissolving rate in water is fast) and is larger in surface activity than PVA generally used, the dispersibility to the polymer powder to be granulated is large and the PVA powder is uniformly diffused in the polymer powder to be agglomerated. Accordingly, the OA-containing PVA can act effectively as the binder, even if using it in a small amount. Also, the granules having a narrow particle size distribution and a large average particle size can be obtained.

The oxyalkylene group used herein means a group having a structure represented by the formula (I):

$$\text{+CH—CHO}\!\!\!\!\!\!\!\!\!\!\!\!\!\!\!\!\!\!\underset{\underset{R^1}{|}}{\phantom{X}}\underset{\underset{R^2}{|}}{\phantom{X}}\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!)_n X \quad (I)$$

wherein $R^1$ and $R^2$ are the same or different and each is a hydrogen atom or an alkyl group, preferably having 1 to 4 carbon atoms; X is hydrogen atom or an organic residue such as an alkyl group, preferably having 1 to 20 carbon atoms, an alkylester group, preferably having 1 to 20 carbon atoms, an alkylamido group, preferably having 1 to 20 carbon atoms or a sulfonate group; and n is an integer of 1 to 300, preferably from 2 to 300, more preferably from 5 to 300. As the group X, hydrogen atom is preferable. Among the oxyalkylene groups, polyoxyethylene groups and polyoxypropylene groups are preferable because they can make the solubility to water and the surface activity large.

It is preferable that a content of the groups having the oxyalkylene groups in the OA-containing PVA (a content of units derived from an unsaturated monomer having the oxyalkylene group in the OA-containing PVA) is from 0.1 to 5% by mole, more preferably from 0.5 to 3% by mole. When the content of the group having the oxyalkylene group (the content of units derived from an unsaturated monomer having the oxyalkylene group in the OA-containing PVA) is less than 0.1% by mole, it is hard to obtain the effects of the present invention. On the other hand, when the content is more than 5% by mole, the mechanical strengths of the granules tend to lower.

The degree of hydrolysis of the OA-containing PVA is preferably at least 40% by mole, more preferably at least 60% by mole, especially at least 80% by mole. When the degree of hydrolysis is less than 40% by mole, the solubility to water tends to lower.

It is preferable that a viscosity of an aqueous solution containing 4% by weight of the OA-containing PVA is from 2 to 40 cps/20° C., more preferably from 3 to 30 cps/20° C. When the viscosity of the aqueous solution is less than 2 cps/20° C., the mechanical strengths of the granules tend to lower. On the other hand, when the viscosity is more than 40 cps/20° C., the particle size distribution of the granules tends to become broad.

The OA-containing PVA can be prepared in any method. For instance, there are exemplified (1) a method wherein a vinyl ester is polymerized in the presence of the polyoxyalkylene, and the obtained polymer is hydrolyzed;

(2) a method wherein a vinyl ester and an unsaturated monomer having the oxyalkylene group are copolymerized, and the obtained copolymer is hydrolyzed;

(3) a method wherein the addition reaction of an alkylene oxide to polyvinyl alcohol (partially hydrolyzed polyvinyl acetate or completely hydrolyzed polyvinyl acetate) is conducted; and the like. Among the preparation methods (1) to (3), the method (2) is practical from the viewpoints of the preparation and properties of the obtained OA-containing PVA.

Examples of the unsaturated monomers having the oxyalkylene group used in the method (2) are recited as follows:

(Meth)acrylic ester monomers represented by the formula:

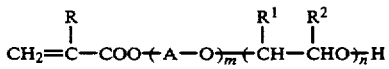

wherein R is hydrogen atom or methyl group, A is an alkylene group, a substituted alkylene group, phenylene group or a substituted phenylene group, m is 0 or an integer of not less than 1, and $R^1$, $R^2$ and n are as defined above; for instance, polyoxyethylene (meth)acrylate, polyoxypropylene (meth)acrylate, and the like;

(Meth)acrylic amide monomers represented by the formula:

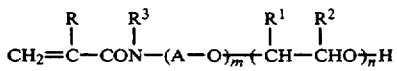

wherein $R^3$ is hydrogen atom, an alkyl group or a group:

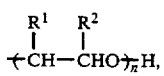

and A, R, $R^1$, $R^2$, m and n are as defined above; to instance, polyoxyethylene (meth)acrylic amide, polyoxypropylene (meth)acrylic amide, polyoxyethylene (1-(meth)acrylamido-1,1-dimethylpropyl)ester, polyoxypropylene (1-(meth)acrylamido-1,1-dimethylpropyl)ester, and the like;

(Meth)allyl alcohol monomers represented by the formula:

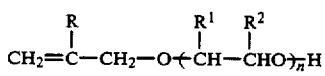

wherein R, $R^1$, $R^2$ and n are as defined above; for instance, polyoxyethylene (meth)allyl ether, polyoxypropylene (meth)allyl ether, and the like;

Vinyl ether monomers represented by the formula:

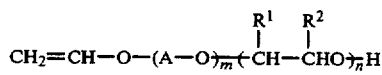

wherein A, $R^1$, $R^2$, m and n are as defined above; for instance, polyoxyethylene vinyl ether, polyoxypropylene vinyl ether, and the like. The unsaturated monomers having the oxyalkylene group are not limited thereto.

Among these unsaturated monomers having the oxyalkylene group, the (meth)allyl alcohols, particularly polyoxyethylene monoallyl ether and polyoxypropylene monoallyl ether, are preferable, because they are excellent in water-solubility and the surface activity becomes large.

The unsaturated monomer may be used alone or as an admixture thereof.

Examples of the vinyl esters used in the method (2) are, for instance, vinyl formate, vinyl acetate, vinyl propionate, vinyl butyrate, vinyl caprate, vinyl laurate, vinyl ester of versatic acid, vinyl palmitate, vinyl stearate, and the like. The vinyl ester may be used alone or as an admixture thereof. Vinyl acetate is preferable in practical use.

In the method (2), a monomer other than the unsaturated monomer having lithe oxyalkylene group and the vinyl ester may be used in a small amount such that the water-solubility of the OA-containing PVA is not impaired upon the polymerization of the unsaturated monomer and the vinyl ester. For instance, the OA-containing PVA may contain not more than 30% by mole of the other monomer.

Examples of the other monomers are, for instance, an alkyl ester of ethylenically unsaturated carboxylic acid such as methyl crotonate, ethyl crotonate, methyl itaconate, ethyl itaconate, methyl sorbicate, ethyl sorbicate, a monoalkyl ester of maleic acid, a dialkyl ester of maleic acid, an alkyl ester of oleic acid, methyl (meth)acrylate, ethyl (meth)acrylate, propyl (meth)acrylate, butyl (meth)acrylate, pentyl (meth)acrylate, heptyl (meth)acrylate, octyl (meth)acrylate, decyl (meth)acrylate, hexadecyl (meth)acrylate or octadecyl (meth)acrylate;

an allyl ester of saturated carboxylic acid such as allyl stearate, allyl laurate, allyl ester of coconut oil fatty acid, allyl octylate or allyl butyrate;

an α-olefin such as ethylene, propylene, α-hexene, α-octene, α-decene, α-dodecene, α-hexadecene or α-octadecene;

an ethylenically unsaturated carboxylic acid such as (meth)acrylic acid, crotonic acid, maleic acid, maleic anhydride, fumaric acid or itaconic acid, their alkali metal salt or their ammonium salt;

an alkyl vinyl ether such as propyl vinyl ether, butyl vinyl ether, hexyl vinyl ether, octyl vinyl ether, decyl vinyl ether, dodecyl vinyl ether, tetradecyl vinyl ether, hexadecyl vinyl ether or octadecyl vinyl ether;

an alkyl allyl ether such as propyl allyl ether, butyl allyl ether, hexyl allyl ether, octyl allyl ether, decyl allyl ether, dodecyl allyl ether, tetradecyl allyl ether, hexadecyl allyl ether or octadecyl allyl ether;

(meth)acrylamide, (meth)acrylonitrile, styrene, vinyl chloride, and the like.

The copolymerization method is not particularly limited and any known method is applicable. Usually, a solution polymerization method using an alcohol such as methanol, ethanol or isopropyl alcohol as a solvent is applied. Emulsion polymerization and suspension polymerization can be, of course, applied.

Any method is applicable to the supplying method of the monomers in the solution polymerization. For instance, there are exemplified a method wherein a copolymerization of a mixture of the whole amount of the vinyl ester and a part amount of the unsaturated monomer having the oxyalkylene group begins to conduct and, during the copolymerization, the rest of the unsaturated monomer is continuously or intermittently added to the copolymerization system; a method wherein copolymerization of a mixture of the whole amount of the unsaturated monomer having the oxyalkylene group and a part amount of the vinyl esther begins to conduct, and, during the copolymerization, the rest of the vinyl ester is continuously or intermittently added to the copolymerization system; a method wherein all of the monomers are supplied at once. The copolymerization is conducted using a known radical polymerization initiator such as azobisisobutyronitrile, acetyl peroxide, benzoyl peroxide or lauroyl peroxide at a temperature of 50° to the reflux temperature.

The obtained copolymer is dissolved in an alcohol and the hydrolysis reaction is conducted in the presence of an alkali catalyst. Examples of the alcohols are, for instance, methanol, ethanol, butanol, and the like. The concentration of the copolymer in the alcohol solution is from 20 to 50% by weight. It is required to use as the hydrolysis catalyst, an alkali catalyst such as a hydroxide of alkali metal e.g. sodium hydroxide or potassium hydroxide, or an alcoholate of alkali metal e.g. sodium methylate, sodium ethylate or potassium methylate. It is preferable that the amount of the catalyst is from 1 to 100 millimole per mole of the vinyl ester. The hydrolysis temperature is not particularly limited. The hydrolysis reaction is conducted at a temperature of usually 10° to 70° C., preferably from 30° to 40° C. for usually 2 to 3 hours.

The OA-containing PVA may be used alone or as an admixture thereof.

In the agglomeration process of the present invention, the polymer powder is mixed with the OA-containing PVA in the presence of water.

Any method can be applicable to the mixing method of the present invention. There are, for instance, a method wherein the OA-containing PVA powder is added to the polymer powder and the mixture is stirred with heating while adding water to the mixture; a method wherein an aqueous solution of the OA-containing PVA is sprayed to the polymer powder, and the mixture is stirred; and the like.

The OA-containing PVA is used in an amount of from 0.05 to 5.0% by weight, preferable from 0.2 to 2.0% by weight of the polymer powder.

It is essential in the present invention that the polymer powder is mixed with the OA-containing PVA in the presence of water. It is preferable that the amount of water is from 10 to 80% by weight, more preferably from 20 to 70% by weight of the polymer powder. Water can be supplied at once, continuously or intermittently (dividing into several).

When the amount of the OA-containing PVA is less than 0.05% by weight, it is difficult to agglomerate the powder. On the other hand, when the amount of the OA-containing PVA is more than 5% by weight, there is a tendency that the obtained granules are too large in average particle size or are poor in water resistance.

After conducting the mixing and stirring as mentioned above, the obtained mixture is dried at a temperature of 50° to 90° C. at atmospheric pressure, if necessary in vacuo, to give the desired granules. During drying the mixture, the particle size of the granules can be adjusted to be a desired size by stirring the mixture, or the like.

The granules prepared according to the present invention can provide finished goods having excellent physical properties, because the obtained granules have no block and have no binder undissolved. Moreover, the obtained granules are sharp in particle size distribution, and the average particle size of the obtained granules is within the range that the granules are easily handled on practical use.

The present invention is more specifically described and explained by means of the following Examples wherein all percents and parts are by weight unless otherwise noted. It is to be understood that the present invention is not limited to the Examples, and various changes and modifications may be made in the invention without departing from the spirit and scope thereof.

REFERENCE EXAMPLE 1

Preparation of OA-containing PVA

An oxyethylene group-containing monomer having the formula:

$$CH_2=CH-CH_2O-(CH_2CH_2O)_l-H$$

wherein l was 15 (calcd.) and vinyl acetate were copolymerized, and the obtained copolymer was hydrolyzed to give an EO-modified PVA having a viscosity of 4% aqueous solution of the EO-modified PVA of 6 cps/20° C., a content of the oxyethylene group-containing monomer of 2.0% by mole, and a degree of hydrolysis of 98% by mole.

REFERENCE EXAMPLE 2

Preparation of OA-containing PVA

An oxypropylene group-containing monomer having the formula:

$$CH_2=CH-CH_2O-(CH(CH_3)CH_2O)_{l'}-H$$

wherein l' was 15 (calcd.) and vinyl acetate were copolymerized, and the obtained copolymer was hydrolyzed to give a PO-modified PVA having a viscosity of 4% aqueous solution of the PO-modified PVA of 10 cps/20° C., a content of the oxypropylene group-containing monomer of 1.0% by mole and a degree of hydrolysis of 98% by mole.

EXAMPLES 1 AND 2 AND COMPARATIVE EXAMPLES 1 AND 2

Sodium polyacrylate powder having a degree of neutralization of 75% by mole, a water content of 23% and an average particle size of 120 μm (hereinafter referred to as "SAP") was prepared in a usual reversed phase suspension polymerization using cyclohexane as a solvent. A 1 l kneader was charged with 189 g of the SAP and a solution wherein 300 ppm, based on the SPA, of a difunctional epoxy compound (commercially available under the trade mark "CELOXIDE" from Daicel Chemical Industries, Ltd.,) was dissolved in 37 g of cyclohexane, and the mixture was stirred ! ! to remove hexane from it. A binder powder shown in Table 1 was added in an amount shown in Table 1 to the kneader at room temperature with stirring, and the mixture was stirred for 15 minutes. Then, the temperature was elevated to 70° C. and the stirring was continued for 120 minutes. During the stirring, 9%, based on the SPA excluding water, of water was added to the mixture 40 minutes later after reaching the temperature to 70° C. and 5%, based on the SPA excluding water, of water was added 80 minutes later after reaching the temperature to 70° C.

Then, the resulting mixture was dried in the kneader at 70° C. for 1 hour. under atmospheric pressure while stirring it, further was dried by allowing to stand at 90° C. for 1.5 hours in vacuo to give 160 g of granules having a water content of about 5%.

As to the obtained granules, a particle size distribution was measured and a water absorption was measured in the following method. The results are shown in Table 1.

Physiologic Saline Absorption and Deionized Water Absorption

A 500 ml beaker is charged with 0.2 g of the dried granules having a particle size of 20 to 100 mesh, and 60 g of physiologic saline (0.9% aqueous solution of sodium chloride) or 200 g of deionized water is added thereto. After the mixture is lightly stirred with a glass bar, it is allowed to stand for 1 hour at room temperature, and the granules are filtered off through a 325-mesh wire net. The weight of the gel remaining on the net is measured and the absorption was calculated according to the following equation.

$$\text{Absorption} = \frac{[\text{Weight of the gel remaining on the net (g)}] - 0.2 \text{ (g)}}{0.2 \text{ (g)}}$$

TABLE 1

| Ex. No. | Binder Kind | Binder Amount*4 (%) | Average particle size of binder (μm) | Particle size of the obtained granules (%) More than 20 mesh | Particle size of the obtained granules (%) From 20 to 100 mesh | Particle size of the obtained granules (%) Less than 100 mesh |
|---|---|---|---|---|---|---|
| Ex. 1 | EO-modified*1 PVA | 1 | 180 | 8.3 | 90.4 | 1.3 |
| Ex. 2 | PO-modified*2 PVA | 1 | 160 | 9.2 | 90.5 | 0.3 |
| Com. Ex. 1 | — | — | — | 6.4 | 78.6 | 15.0 |
| Com. Ex. 2 | GH-17*3 | 2 | 230 | 4.8 | 86.7 | 8.5 |

| Ex. No. | Average particle size of the granules having the particle size of 20 to 100 mesh (μm) | Water absorption (g/g) Deionized water | Water absorption (g/g) 0.9% aqueous solution of NaCl |
|---|---|---|---|
| Ex. 1 | 420 | 400 | 48 |
| Ex. 2 | 520 | 430 | 50 |
| Com. Ex. 1 | 310 | 400 | 44 |
| Com. Ex. 2 | 250 | 480 | 53 |

(Notes)
*1OA-containing PVA prepared in Reference Example 1
*2OA-containing PVA prepared in Reference Example 2
*3Polyvinyl alcohol commercially available from Nippon Gohsei Kagaku Kogyo Kabusbiki Kaisha
*4Percentage based on the SAP excluding water From the results of Table 1, it would be understood that the obtained granules according to the process of the present invention are narrow in particle size distribution, large in particle size, and also excellent in water absorption.

EXAMPLE 3

A 1 l round bottom flask equipped with a stirrer was charged with 600 ml of water, 0.36 g of the PO-modified PVA obtained in Reference Example 2 was dissolved therein, and 0.6 g of AIBN was added to the solution. After elevating the inner temperature of the flask to 75° C., 120 g of styrene monomer was added dropwise to the flask over 1 hour with stirring, further the mixture was stirred at 75° C. for 3 hours, and was cooled down to give a suspension polymerization powder having an average particle size of 120 μm.

After conducting the solid-liquid separation of the reaction mixture, a 1 l kneader was charged with 130 g of the separated cake having a water content of 5%, and a solution wherein 0.24 g of the PO-modified PVA obtained in Reference Example 2 was dissolved in 10 ml of water was sprayed on the surface of the cake with stirring. After elevating the jacket temperature to 80° C., the mixture was stirred for 2 hours to give dried granules having an average particle size of 350 μm.

EXAMPLE 4

A 300 l polymerization vessel equipped with a Pfaudler type impeller was charged with 120 l of water and 35 g of a polyvinyl alcohol (commercially available under the trade mark "GOHSENOL KH-17"from Nippon Gohsei Kagaku Kogyo Kabushiki Kaisha). After elevating the inner temperature to dissolve, 10 g of di-2-ethylhexylperoxydicarbonate as a polymerization initiator and 75 kg of vinyl chloride monomer were supplied under pressure, and the polymerization was carried out at 58° C. for 8.5 hours. After conducting the solid-liquid separation of the polymerization mixture, the separated cake was dried under pressure at 60° C. for 24 hours to give a PVC powder having an average particle size of 135 μm.

A 5 l kneader was charged with 1000 g of the obtained PVC powder, and a solution wherein 3 g of the PO-modified PVA obtained in Reference Example 2 was dissolved in 100 ml of water, was sprayed on the surface of the cake with stirring. After elevating the jacket temperature to 70° C., the mixture was stirred for 3 hours to give dried granules having an average particle size of 300 μm.

According to the process for agglomerating the powder of the present invention, it is possible to easily prepare the granules having little fine powder having a particle size of less than 100 mesh, having narrow particle size distribution and large average particle size.

In addition to the ingredients used in the Examples, other ingredients can be used in the Examples as set forth in the specification to obtain substantially the same results.

What we claim is:

1. A process for agglomerating a polymer powder which comprises:
    copolymerizing a vinyl ester with an unsaturated monomer having an oxyalkylene group to obtain a copolymer, hydrolyzing the obtained copolymer to give an oxyalkylene group-containing polyvinyl alcohol resin, and
    mixing a polymer powder with the oxyalkylene group-containing polyvinyl alcohol resin in the presence of water, and drying the resulting mixture, wherein said unsaturated monomer having an oxyalkylene group is a (meth)acrylic amide monomer represented by the formula:

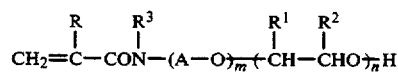

wherein R is hydrogen atom or methyl group, A is an alkylene group, a substituted alkylene group, a phenylene group or a substituted phenylene group, $R^1$ and $R^2$ are the same or different and each is hydrogen atom or an alkyl group, $R^3$ is hydrogen atom, an alkyl group or a group represented by the formula:

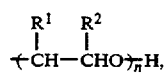

wherein m is 0 or an integer of not less than 1 and n is an integer of 1 to 300, a (meth)allyl alcohol monomer represented by the formula:

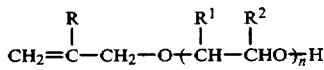

wherein R, $R^1$, $R^2$ and n are as defined above or a vinyl ether monomer represented by the formula:

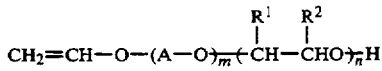

wherein A, $R^1$, $R^2$, m and n are as defined above.

2. The process of claim 1, wherein said polymer powder is a water-absorbent resin powder.

3. The process of claim 1, wherein said oxyalkylene group-containing polyvinyl alcohol resin is an oxypropylene group-containing polyvinyl alcohol resin.

4. The process of claim 1, wherein said oxyalkylene group is represented by the formula (I):

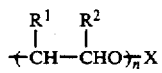

wherein $R^1$ and $R^2$ are the same or different and each is a hydrogen atom or an alkyl group, X is a hydrogen atom or an organic residue, and n is an integer of 1 to 300.

5. The process of claim 4, wherein the content of the oxyalkylene groups in said polyvinyl alcohol resin is from 0.1 to 5% by mole.

6. The process of claim 1, wherein the mixture of polymer powder and oxyalkylene group-containing polyvinyl alcohol resin comprises from 0.05 to 5.0% by weight of the oxyalkylene group-containing polyvinyl alcohol resin.

7. The process of claim 1, wherein the amount of water is from 10 to 80% by weight of the polymer powder.

8. The process of claim 2, wherein said polymer powder is a water-absorbent resin powder.

9. The process of claim 2, wherein said oxyalkylene group-containing polyvinyl alcohol resin is an oxypropylene group-containing polyvinyl alcohol resin.

* * * * *